US012745085B2

(12) United States Patent
Yamanaka et al.

(10) Patent No.: US 12,745,085 B2
(45) Date of Patent: Sep. 22, 2026

(54) ELECTRIC MOBILE VEHICLE, PORTABLE TERMINAL DEVICE, AND WIRELESS COMMUNICATION PROGRAM

(71) Applicant: Panasonic Intellectual Property Management Co., Ltd., Osaka (JP)

(72) Inventors: Koki Yamanaka, Osaka (JP); Katsuaki Hamamoto, Gifu (JP); Naohisa Morimoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 280 days.

(21) Appl. No.: 18/683,294

(22) PCT Filed: Jul. 20, 2022

(86) PCT No.: PCT/JP2022/028250

§ 371 (c)(1),
(2) Date: Feb. 13, 2024

(87) PCT Pub. No.: WO2023/021913

PCT Pub. Date: Feb. 23, 2023

(65) Prior Publication Data

US 2024/0349054 A1 Oct. 17, 2024

(30) Foreign Application Priority Data

Aug. 18, 2021 (JP) ................................ 2021-133338

(51) Int. Cl.

| | |
|---|---|
| ***H04W 12/08*** | (2021.01) |
| ***B60L 53/80*** | (2019.01) |
| ***H04W 12/0471*** | (2021.01) |

(52) U.S. Cl.

CPC ............. *H04W 12/08* (2013.01); *B60L 53/80* (2019.02); *H04W 12/0471* (2021.01); *B60L 2200/12* (2013.01)

(58) Field of Classification Search

CPC .... H04W 12/08; H04W 12/0471; B60L 53/80

See application file for complete search history.

(56) References Cited

U.S. PATENT DOCUMENTS

| | | | | |
|---|---|---|---|---|
| 2010/0241857 A1 | 9/2010 | Okude et al. | | |
| 2014/0253021 A1* | 9/2014 | Luke ....................... | B60L 53/65 | 320/137 |

(Continued)

FOREIGN PATENT DOCUMENTS

| | | | | |
|---|---|---|---|---|
| CN | 101855861 A | 10/2010 | | |
| CN | 103843225 B * | 1/2018 | ................ | H02J 7/90 |
| JP | 2019-164770 | 9/2019 | | |

OTHER PUBLICATIONS

The EPC Office Action dated Apr. 15, 2025 for the related European Patent Application No. 22858235.9.

(Continued)

*Primary Examiner* — Erika A Washington

(74) *Attorney, Agent, or Firm* — Rimon P.C.

(57) ABSTRACT

In an electric mobile vehicle to which a power storage pack is attached, a controller obtains, from the power storage pack via wired or wireless communication, a verification code that is to be used in a process of exchanging an encryption key that is to be used for short-range wireless communication between the power storage pack and a portable terminal device. A notification unit presents, to a user of the portable terminal device, a tentative notification of the verification code obtained from the power storage pack.

8 Claims, 5 Drawing Sheets

(56) References Cited

U.S. PATENT DOCUMENTS

2015/0074004 A1 3/2015 Song
2019/0279285 A1 9/2019 Lin et al.

OTHER PUBLICATIONS

The EPC Office Action dated Oct. 28, 2024 for the related European Patent Application No. 22858235.9.
Sai Swaroop Madugula et al: "An Enhanced Passkey Entry Protocol for Secure Simple Pairing in Bluetooth", arxiv.org, Cornell University Library, 201 Olin Library Cornell University Ithaca, NY 14853, Jan. 23, 2021 (Jan. 23, 2021), XP081866038.
International Search Report of PCT application No. PCT/JP2022/028250 dated Sep. 20, 2022.
English Translation of Chinese Search Report dated May 27, 2026 for the related Chinese Patent Application No. 202280055167.0.

* cited by examiner

ELECTRIC MOBILE VEHICLE, PORTABLE TERMINAL DEVICE, AND WIRELESS COMMUNICATION PROGRAM

CROSS-REFERENCE TO RELATED APPLICATIONS

This application is a U.S. national stage application of the PCT International Application No. PCT/JP2022/028250 filed on Jul. 20, 2022, which claims the benefit of foreign priority of Japanese patent application No. 2021-133338 filed on Aug. 18, 2021, the contents all of which are incorporated herein by reference.

TECHNICAL FIELD

The present disclosure relates to an electric mobile vehicle to which a power storage pack is attached, a portable terminal device, and a wireless communication program.

BACKGROUND ART

In recent years, electric assisted bicycles have become popular. Detachable, portable battery packs are used in the electric assisted bicycles. In order to remove terminals for communication lines from connectors of the battery packs, a system has been developed in which a battery pack and an electric assisted bicycle include wireless communication functions and control signals are transmitted wirelessly. Furthermore, a system has been developed in which a battery pack including a wireless communication function and a portable terminal device such as a smartphone as a monitoring device are connected wirelessly so that the battery pack is monitored and controlled from the external portable terminal device.

It is conceivable that in order to improve the security of a pairing process that is performed to connect the portable terminal device and the battery pack via short-range wireless communication, a verification code will be displayed on the battery pack so that when the verification code is input to the portable terminal device, the devices will be verified. However, providing the battery pack with a display capable of displaying a verification code with multiple digits leads to an increase in cost.

It is conceivable that the verification code in the form of a barcode sticker, a QR code (registered trademark) sticker, or another sticker will be attached to the battery pack (for example, refer to Patent Literature (PTL) 1).

CITATION LIST

Patent Literature

PTL 1: Unexamined Japanese Patent Publication No. 2019-164770

SUMMARY OF INVENTION

When a sticker on which a barcode, a QR code, or the like is printed is attached to the battery pack, it is difficult to pair a portable terminal device and the battery pack attached to a vehicle structured so that the battery pack is not exposed to the outside. Furthermore, the verification code shown as the barcode, the QR code, or the like has a fixed value during operation unless the sticker is replaced with a new one. In this case, the level of security is lower than that in operation in which a new verification code is generated every time a verification code is issued. A state where the sticker on which the barcode, the QR code, or the like is printed is attached to the battery pack refers to a state where information of the verification code is constantly exposed to the outside.

The present disclosure is conceived in view of this situation and has an object to provide a technique to improve the security of a pairing process for a power storage pack and a portable terminal device.

In order to solve the above problem, an electric mobile vehicle according to one aspect of the present disclosure is an electric motor vehicle to which a power storage pack is attached and includes: a controller that obtains a verification code from the power storage pack via wired or wireless communication, the verification code being used in a process of exchanging an encryption key that is to be used for short-range wireless communication between the power storage pack and a portable terminal device; and a notification unit that presents, to a user of the portable terminal device, a tentative notification of the verification code obtained from the power storage pack.

Note that an arbitrary combination of the structural elements described above and those obtained by converting the expressions described in the present disclosure into devices, systems, methods, computer programs, and recording media having the computer programs recorded thereon, for example, are also effective as embodiments of the present disclosure.

With the present disclosure, the security of a pairing process for a power storage pack and a portable terminal device can be improved.

DESCRIPTION OF EMBODIMENTS

Figure 1:
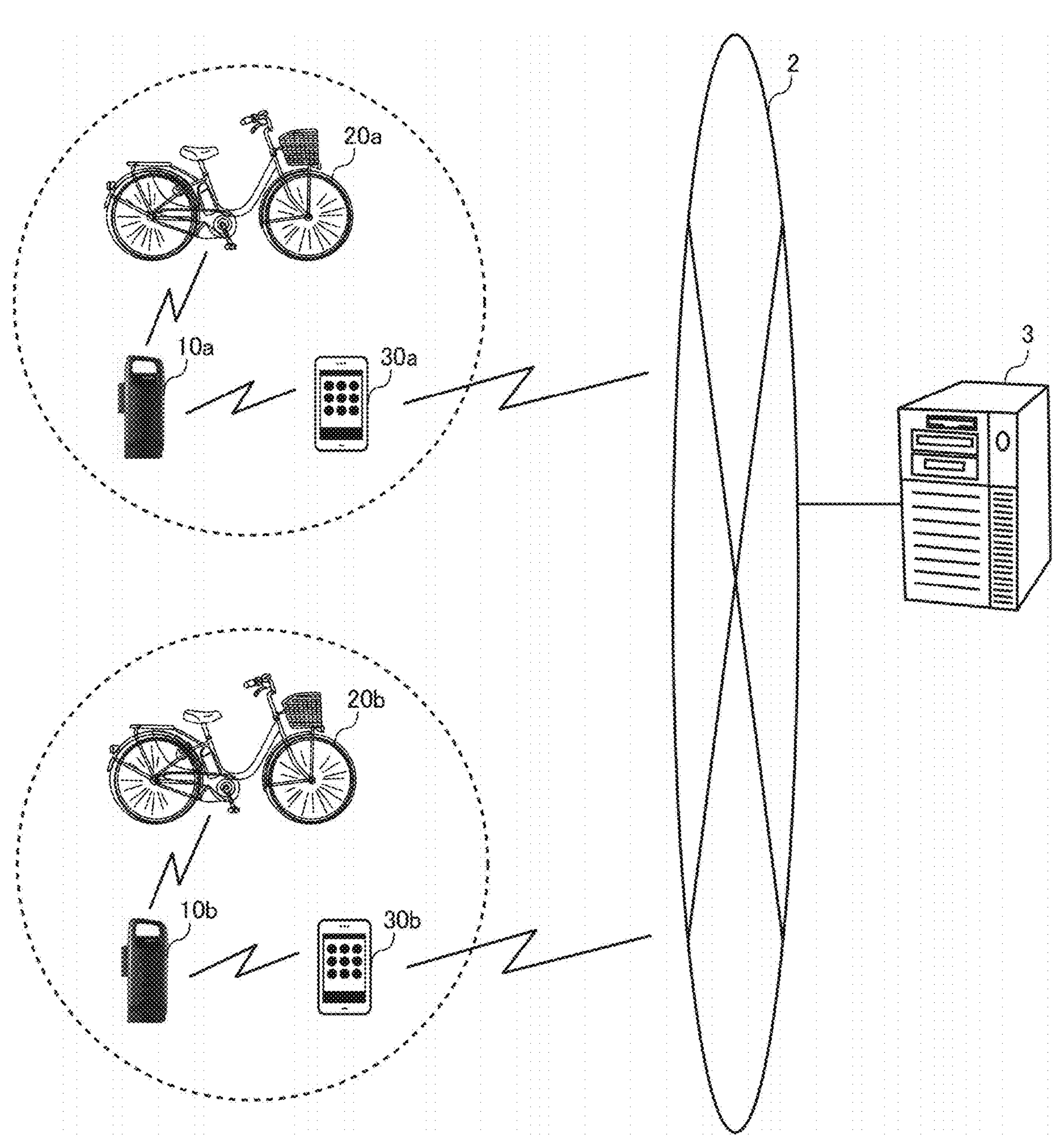
FIG. 1 is a diagram illustrating the overall configuration of a management service for a battery pack according to an exemplary embodiment.

FIG. 1 is a diagram illustrating the overall configuration of a management service for battery pack 10 according to an exemplary embodiment. Battery pack 10, which is a detachable, portable, replaceable battery pack, can be attached to a mounting slot of vehicle 20 or a charger (not illustrated in the drawings). Hereinafter, the exemplary embodiment assumes that vehicle 20 is an electric assisted bicycle.

Replaceable battery pack 10 is frequently attached to or detached from the mounting slot of vehicle 20 or the charger, and therefore a connector part of battery pack 10 is prone to wear and tear. Thus, in the present exemplary embodiment, battery pack 10 is provided with a wireless communication function to wirelessly transmit control signals. This allows for removal of a terminal for communication lines from a connector of battery pack 10, leaving only a terminal for power lines.

Short-range wireless communication is used for the wireless communication between vehicle 20 and battery pack 10. As the short-range wireless communication, Bluetooth (registered trademark), Wi-Fi (registered trademark), infrared communication, or the like can be used. Hereinafter, the present exemplary embodiment assumes that Bluetooth Low Energy (BLE) is used as the short-range wireless communication.

BLE, which is one extended standard of Bluetooth, is a short-range wireless communication standard for low power consumption using the 2.4 GHz band. BLE focuses on low power consumption allowing a device to operate for several years on a single button cell, meaning that BLE is suitable for battery powered devices and can minimize the impact on the remaining capacity of battery pack 10. Furthermore, many modules for BLE communication are available in the market and thus are accessible at low cost.

Moreover, BLE is highly compatible with a smartphone and can provide various services in conjunction with the smartphone. In the present exemplary embodiment, battery pack 10 and portable terminal device 30 owned by a user are connected via the short-range wireless communication. A smartphone, a smartwatch, a tablet, a small laptop personal computer (PC), a portable game console, or the like can be used as portable terminal device 30. Hereinafter, the present exemplary embodiment assumes that portable terminal device 30 is a smartphone and that battery pack 10 and the smartphone are connected via BLE.

Battery pack management system 3 is a system that collectively manages the states of a plurality of battery packs 10. Battery pack management system 3 is constructed on a battery manufacturer cloud server installed in a battery manufacturer facility or a data center or is constructed on a cloud server that is used in accordance with a cloud service contract, for example. Note that instead of a battery manufacturer, an operation entity that provides an electric assisted bicycle rental service, an electric assisted bicycle sharing service, or the like may construct battery pack management system 3.

Battery pack management system 3 and portable terminal device 30 are connected to network 2. Network 2 is a generic term of communication paths such as the Internet, a dedicated line, and a virtual private network (VPN); the communication medium, the protocol, etc., of network 2 are not limited. As the communication medium, a mobile network (cellular network), a wireless local area network (LAN), a wired LAN, a fiber optic network, an asymmetric digital subscriber line (ADSL) network, or a cable television (CATV) network can be used, for example. As the communication protocol, transmission control protocol (TCP)/Internet protocol (IP), user datagram protocol (UDP)/IP, or Ethernet (registered trademark) can be used, for example.

In the present exemplary embodiment, portable terminal device 30 is connected to network 2 via a base station of a 4G/5G mobile network or a Wi-Fi access point. Battery pack management system 3 is connected to network 2 via a router. Battery pack 10 can be indirectly connected to a device on the Internet when battery pack 10 is connected to portable terminal device 30 via short-range wireless communication.

Battery pack management system 3 manages, as basic information, the identification information (pack ID), the manufacturing date, the owner information (name, address, phone number, e-mail address, etc.), and the warranty coverage of each battery pack 10. There are cases where the owner and the manager of battery pack 10 that is used in an electric assisted bicycle rental service, an electric assisted bicycle sharing service, or the like are different. In these cases, battery pack management system 3 manages manager information as well. Furthermore, battery pack management system 3 can also manage user information of a user who has rented an electric assisted bicycle and is currently using the electric assisted bicycle.

Battery pack management system 3 can obtain, via portable terminal device 30 of each user, status information indicating the current state of corresponding battery pack 10 paired with said portable terminal device 30. For example, the state of health (SOH) of battery pack 10 can be obtained. When the SOH of battery pack 10 falls below a predetermined value, battery pack management system 3 can send an e-mail prompting the owner or the manager to replace battery pack 10 with a new one.

Furthermore, battery pack management system 3 can also obtain current position information of battery pack 10 via portable terminal device 30. As the current position information of battery pack 10, global positioning system (GPS) information of portable terminal device 30 paired with battery pack 10 can be used. In the case of a rental service, a sharing service, or the like, battery pack management system 3 can send, to portable terminal device 30 of a user who is currently using an electric assisted bicycle, a notification indicating where the electric assisted bicycle is to be returned.

When a typical Class 2 device is used, the BLE radio wave arrival range is approximately 10 meters. Therefore, a plurality of vehicles 20*a*, 20*b* and a plurality of battery packs 10*a*, 10*b* may be present in one BLE communication range. In this case, there may be radio wave interference between vehicles systems, making the operation unstable. Vehicle 20 may be erroneously connected to battery pack 10 that is not attached thereto, but is located adjacent thereto; in this case, there is a possibility that battery pack 10 that is not attached to vehicle 20 will be erroneously controlled.

To address this, it is necessary to provide a system that ensures that battery pack 10 attached to vehicle 20 and battery pack 10 communicating with vehicle 20 are the same. In the present exemplary embodiment, using the identification information (ID), it is verified that battery pack 10 physically connected to vehicle 20 via wired communication and battery pack 10 connected to vehicle 20 via wireless communication are the same. This identification information (ID) may be identification information unique to each battery pack 10 or may be temporary identification information. As the unique identification information, a Bluetooth device (BD) address or a medium access control (MAC) address may be used, for example.

Figure 2:
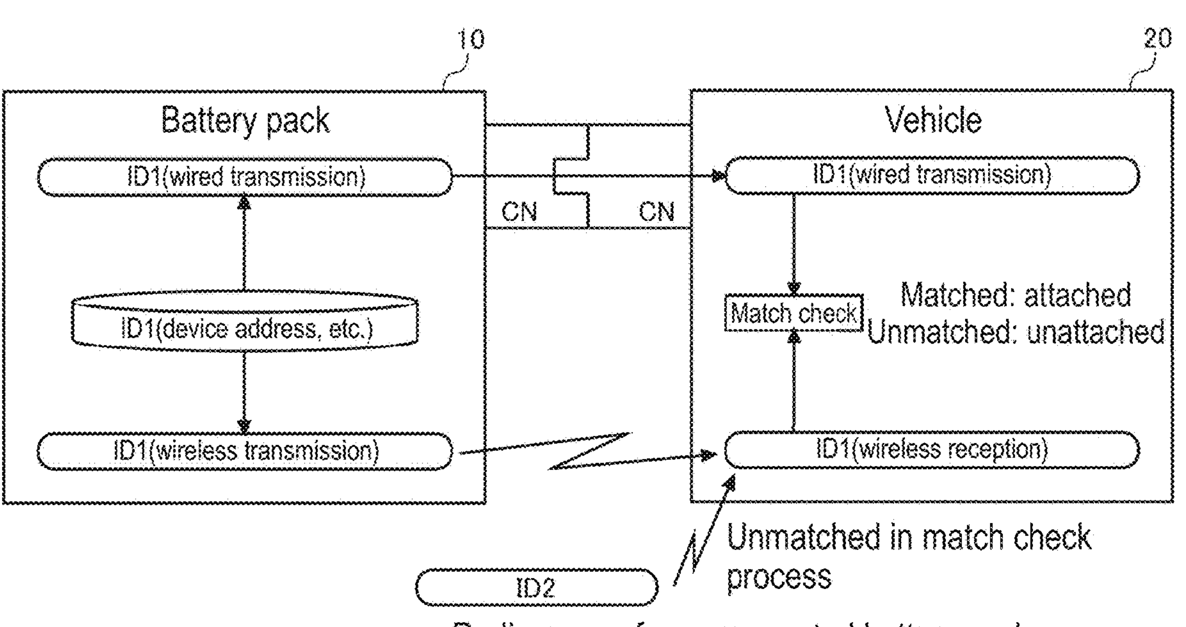
FIG. 2 is a diagram for describing the outline of a process of verifying a battery pack attached to a vehicle.

FIG. 2 is a diagram for describing the outline of the process of verifying battery pack 10 attached to vehicle 20. When the connector of battery pack 10 and the connector of the mounting slot of vehicle 20 are connected, battery pack 10 transmits ID1 via the wired communication. At the same time, battery pack 10 sends an advertising packet (beacon packet) including ID1 via the short-range wireless communication. The advertising packet is a signal for notifying nearby devices of the presence of battery pack 10 via the short-range wireless communication.

When receiving the advertising packet, vehicle 20 checks ID1 included in the advertising packet against ID1 received via the wired communication. When there is a match between these, vehicle 20 verifies that battery pack 10 attached thereto and the entity communicating therewith via the short-range wireless communication are the same. When there is no match between these, vehicle 20 determines that battery pack 10 attached thereto and the entity communicating therewith via the short-range wireless communication are not the same, and does not verify battery pack 10 communicating therewith. For example, when an advertising packet including ID2 is received, battery pack 10 that is a delivery from which the advertising packet including ID2 has been transmitted is not verified because ID2 does not match ID1 received via the wired communication.

In BLE, an encryption key for encrypting data is exchanged between a central device and a peripheral device. In BLE, the process of exchanging the encryption key is called a pairing process. Examples of the main pairing method in BLE include Passkey Entry and Just Works. Passkey Entry is a method in which a 6-digit verification code (also called passkey, passcode, PIN code, PIN number, password, verification number, or the like) is displayed on one of the central device and the peripheral device, the displayed verification code is input to the other, and thus whether the device is a correct device to be paired with is verified. In Passkey Entry, the encryption key to be exchanged has confidentiality and there is protection from a man-in-the-middle attack (MITM attack).

Just Works is a method in which pairing connection is permitted in an operation without verification or with a fixed verification code "000000". In Just Works, the encryption key to be exchanged has no confidentiality and there is no protection from a man-in-the-middle attack. Therefore, with Just Works, there is a risk that the system may be compromised and subject to unauthorized control, hacking, or the like.

In the present exemplary embodiment, a pairing method in which an encryption key to be exchanged has confidentiality, such as Passkey Entry, is used. Commonly used battery pack 10 does not include a display capable of displaying a verification code. Therefore, it is necessary to provide a system that allows battery pack 10 to notify a user of portable terminal device 30 of a verification code in another way.

Figure 3:
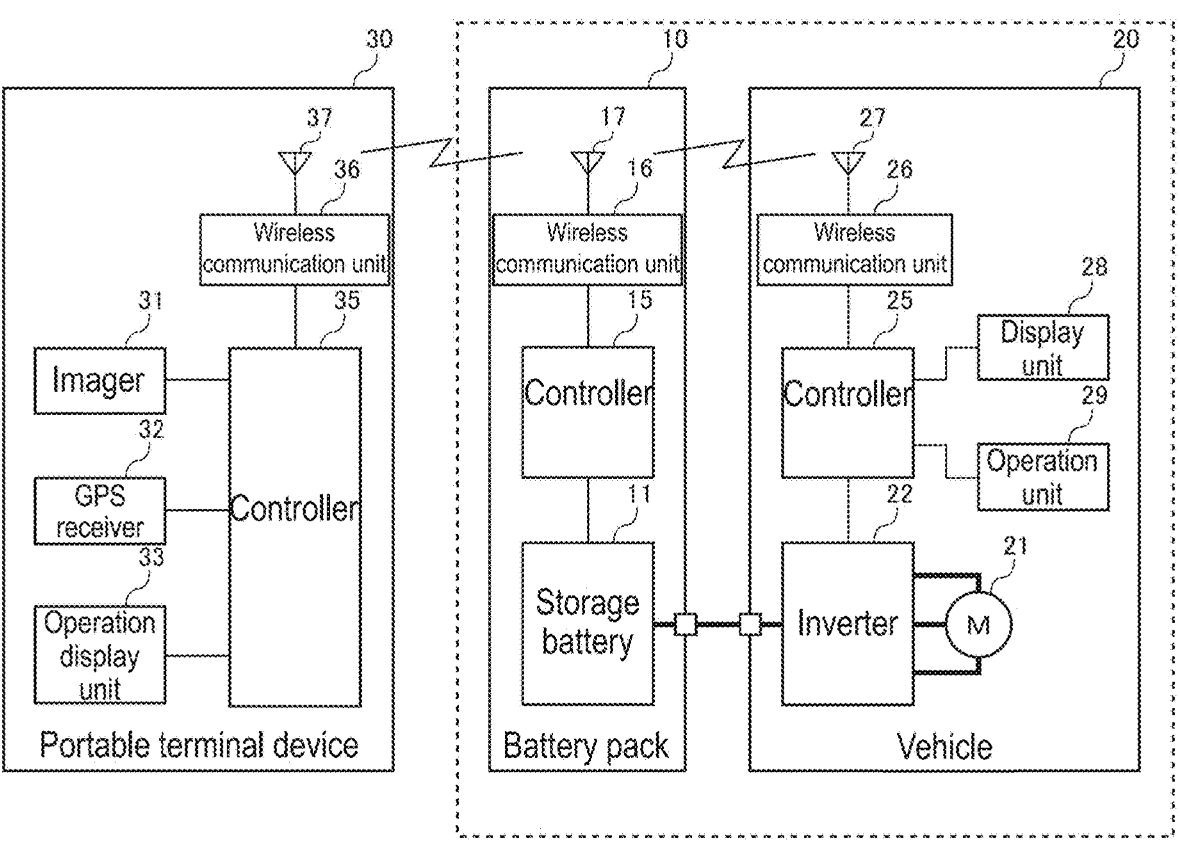
FIG. 3 is a diagram illustrating example configurations of a battery pack, a vehicle, and a portable terminal device according to an exemplary embodiment.

FIG. 3 is a diagram illustrating example configurations of battery pack 10, vehicle 20, and portable terminal device 30 according to an exemplary embodiment. Battery pack 10 includes storage battery 11, first controller 15, first wireless communication unit 16, and first antenna 17.

Storage battery 11 includes a plurality of cells connected in series or series/parallel. As the cells, lithium-ion battery cells, nickel-hydrogen battery cells, lead battery cells, or the like can be used. The following example herein assumes that lithium-ion battery cells (with a nominal voltage of 3.6 V to 3.7 V) are used. The number of cells connected in series is determined according to a drive voltage for motor 21 of vehicle 20.

First controller 15 is a microcontroller that controls entire battery pack 10. First controller 15 monitors the state of storage battery 11 (specifically, the voltage, the electric current, and the temperature at each cell included in storage battery 11). On the basis of the monitoring data, first controller 15 estimates the state of charge (SOC), the full charge capacity (FCC), and the SOH of each cell included in storage battery 11. Furthermore, when an overvoltage, an undervoltage, an overcurrent, a high-temperature anomaly, or a low-temperature anomaly occurs in a cell included in storage battery 11, first controller 15 turns off a switch (not illustrated in the drawings) of a power line to protect the cell.

First wireless communication unit 16 performs a short-range wireless communication process. In the present exemplary embodiment, first wireless communication unit 16 is a BLE module, and first antenna 17 is a pattern antenna or a chip antenna embedded in the BLE module. First wireless communication unit 16 outputs, to first controller 15, data received via the short-range wireless communication, and transmits, via the short-range wireless communication, data that is input from first controller 15.

Vehicle 20 includes motor 21, inverter 22, second controller 25, second wireless communication unit 26, second antenna 27, display unit 28, and operation unit 29. In the state where battery pack 10 is attached to vehicle 20, a power supply terminal of battery pack 10 and a power receiving terminal of vehicle 20 are in physical contact, and a power line in battery pack 10 and a power line in vehicle 20 are in a conductive state.

Vehicle 20 includes a three-phase alternating-current motor as motor 21 for driving. Inverter 22 converts direct-current power supplied from battery pack 10 into alternating-current power and supplies the alternating-current power to motor 21 during power running. During regeneration, the alternating-current power supplied from motor 21 is converted into direct-current power and supplied to battery pack 10. Motor 21 rotates according to the alternating-current power supplied from inverter 22 during power running. During regeneration, rotational energy generated as a result of a reduction in speed is converted into alternating-current power and supplied to inverter 22.

Second controller 25 is a microcontroller that controls entire vehicle 20. Second wireless communication unit 26 performs a short-range wireless communication process. In the present exemplary embodiment, second wireless communication unit 26 is a BLE module, and second antenna 27 is a pattern antenna or a chip antenna embedded in the BLE module. Second wireless communication unit 26 outputs, to second controller 25, data received via the short-range wireless communication, and transmits, via the short-range wireless communication, data that is input from second controller 25.

Display unit 28 includes a display such as a liquid-crystal display, an organic electroluminescent (EL) display, or a mini-LED display. Operation unit 29 includes at least one a physical key. Note that the display may be a touch-panel display. In this case, the touch-panel display functions as display unit 28 and operation unit 29.

Portable terminal device 30 includes imager 31, GPS receiver 32, operation display unit 33, third controller 35, third wireless communication unit 36, and third antenna 37. Imager 31 is a camera unit capable of capturing at least a still image. Imager 31 includes a lens, a solid-state imaging device, and a signal processing circuit. As the solid-state imaging device, a complementary metal oxide semiconductor (CMOS) image sensor or a charge coupled device (CCD) image sensor can be used, for example. The solid-state imaging device converts, into electric video signals, light that has entered the solid-state imaging device through the lens, and outputs the electric video signals to the signal processing circuit. The signal processing circuit performs signal processing such as A/D conversion and noise removal on the video signals that are input from the solid-state imaging device, and outputs the video signals to third controller 35.

GPS receiver 32 detects position information of portable terminal device 30. GPS receiver 32 receives, from a plurality of GPS satellites, radio waves including transmission points in time, and calculates the latitude and longitude of a point of reception on the basis of a plurality of transmission points in time that are included in a plurality of radio waves received. GPS receiver 32 outputs the calculated latitude and longitude of the point of reception to third controller 35 as the position information of portable terminal device 30.

Operation display unit 33 includes a touch-panel display. As the touch-panel display, a liquid-crystal display, an organic EL display, a mini-LED display, or the like can be used. Note that operation display unit 33 may further include a physical key. Furthermore, operation display unit 33 may be configured as a combination of a physical key and a display including no touch-panel functions.

Third controller 35 is a controller that controls entire portable terminal device 30. Third controller 35 can be implemented by the coordination of a hardware resource and a software resource or can be implemented by a hardware resource only. As the hardware resource, a central processing unit (CPU), read-only memory (ROM), random-access memory (RAM), a graphics processing unit (GPU), a digital signal processor (DSP), an image signal processor (ISP), an application specific integrated circuit (ASIC), a field programmable gate array (FPGA), a system on a chip (SoC), and other LSIs can be used. As the software resource, an operating system, middleware, and a program such as an application can be used.

Third wireless communication unit 36 includes one or more communication modules corresponding to a plurality of communication methods (for example, Bluetooth, Wi-Fi, 4G, and 5G). For example, Bluetooth and Wi-Fi may be integrated into one communication module. Third antenna 37 corresponding to each communication method may be embedded in a corresponding communication module or may be an external antenna.

In the present exemplary embodiment, before using vehicle 20, a user needs to download an application program for managing battery pack 10 (hereinafter referred to as a pack management app) from a distribution server onto portable terminal device 30 and install the pack management app on portable terminal device 30. The pack management app has been uploaded to the distribution server in advance, and the distribution server provides the pack management app under management to portable terminal device 30 that has accessed the distribution server via network 2. Alternatively, portable terminal device 30 may be configured to directly access a website managed by battery pack management system 3 and download the pack management app.

Figure 4:
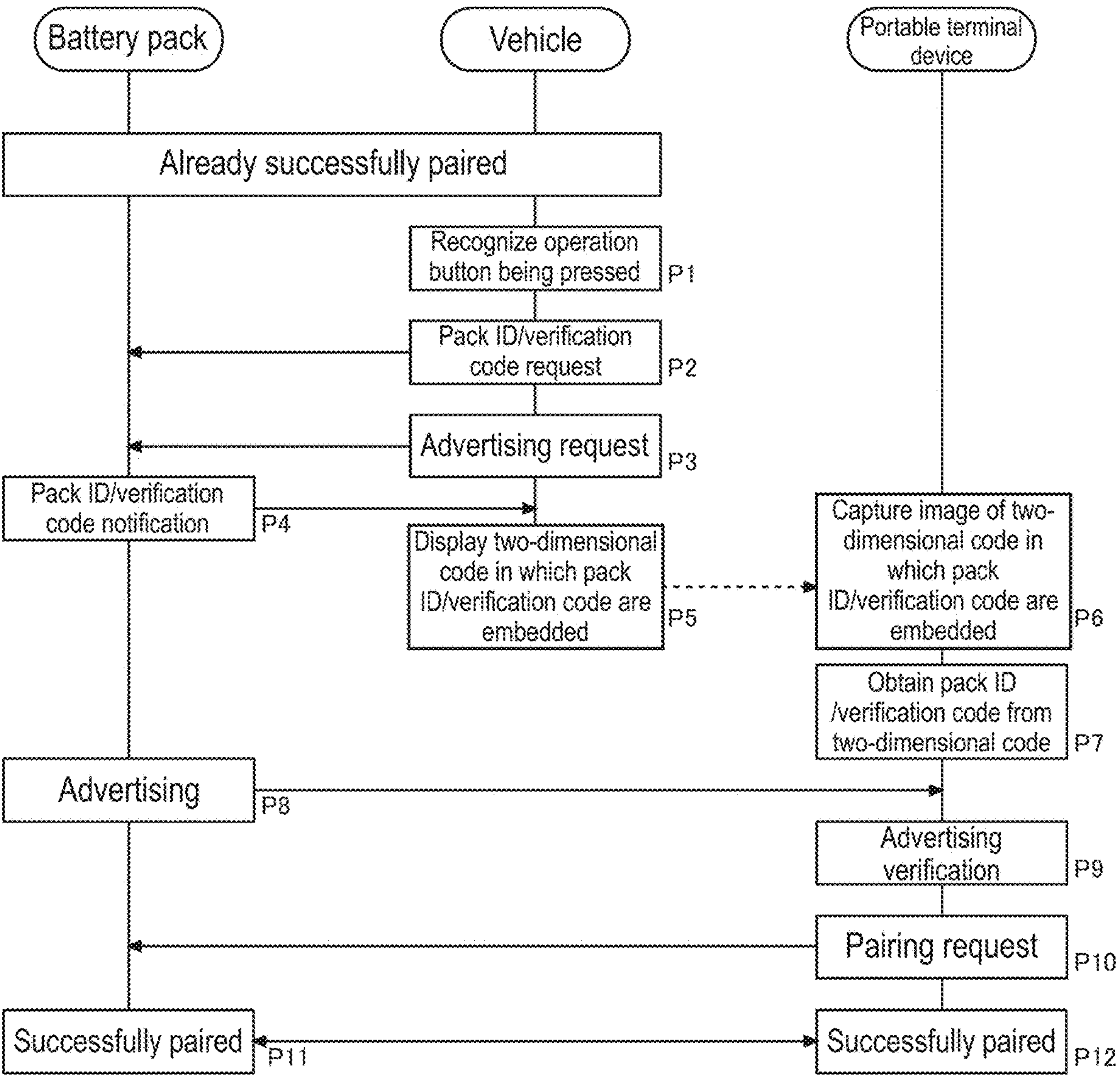
FIG. 4 is a sequence diagram illustrating a first working example of a pairing process for a battery pack and a portable terminal device.

FIG. 4 is a sequence diagram illustrating a first working example of the pairing process for battery pack 10 and portable terminal device 30. In the present exemplary embodiment, the focus will be on the pairing process for battery pack 10 and portable terminal device 30, and thus detailed description of the pairing process for battery pack 10 and vehicle 20 will be omitted. In the sequence diagram illustrated in FIG. 4, battery pack 10 and vehicle 20 have already been successfully paired as a premise. Battery pack 10 may or may not be attached to vehicle 20 as long as battery pack 10 and vehicle 20 are paired and connected. In the present exemplary embodiment, vehicle 20 is interposed into the pairing process for battery pack 10 and portable terminal device 30, and thus the pairing process is made secure.

A user performs a predetermined operation on operation unit 29 of vehicle 20 to pair and connect battery pack 10 and portable terminal device 30 via BLE. For example, when an operation button for starting the pairing and connecting process is provided on operation unit 29, a user presses the operation button. When an operation key for starting the pairing and connecting process is displayed on the touch-panel display, a user presses the operation key.

When second controller 25 of vehicle 20 recognizes the operation for starting the pairing and connecting process that has been performed on operation unit 29 (P1), second controller 25 of vehicle 20 transmits, to battery pack 10, an obtainment request for pack ID and a verification code that is to be used in the pairing process for battery pack 10 and portable terminal device 30 (P2). At the same time, second controller 25 transmits an advertising request to battery pack 10 (P3). Second controller 25 may transmit the obtainment request for pack ID and a verification code and the advertising request via BLE using second wireless communication unit 26 or when battery pack 10 is attached to vehicle 20, may transmit the obtainment request for pack ID and a verification code and the advertising request via wired communication.

When first controller 15 of battery pack 10 receives the obtainment request for pack ID and a verification code from vehicle 20, first controller 15 of battery pack 10 generates a verification code and transmits the pack ID of battery pack 10 itself and the generated verification code to vehicle 20 that is the source of the request (P4). First controller 15 may transmit the pack ID and the verification code via BLE using first wireless communication unit 16 or when battery pack 10 is attached to vehicle 20, may transmit the pack ID and the verification code via wired communication.

When second controller 25 of vehicle 20 obtains the pack ID and the verification code from battery pack 10, second controller 25 of vehicle 20 generates a two-dimensional code (for example, a QR code) in which the pack ID and the verification code obtained are embedded. Second controller 25 causes display unit 28 to display the generated two-dimensional code (P5). Note that instead of the two-dimensional code, a one-dimensional code (for example, a barcode) may be used.

The user starts the pack management app on portable terminal device 30 and uses imager 31 to capture an image of the two-dimensional code displayed on display unit 28 of vehicle 20 (P6). Note that when the pack management app is started, a camera app (a two-dimensional code reader) for reading a two-dimensional code that is in conjunction with the pack management app may be automatically started as a specification.

In portable terminal device 30, third controller 35 that runs the pack management app reads the two-dimensional code in the image that is input from imager 31, and obtains the pack ID and the verification code embedded in the two-dimensional code that has been read (P7).

When first controller 15 of battery pack 10 receives the advertising request from vehicle 20, first controller 15 of battery pack 10 generates an advertising packet including the pack ID of battery pack 10 itself, and sends the generated advertising packet using first wireless communication unit 16 (P8).

When third wireless communication unit 36 receives the advertising packet, third controller 35 of portable terminal device 30 checks the pack ID included in the advertising packet against the pack ID obtained from the captured image of the two-dimensional code. When these match, third controller 35 verifies, as battery pack 10 to be paired and connected, a device that is a source from which the advertising packet has been transmitted (P9). Using third wireless communication unit 36, third controller 35 transmits a pairing request to a delivery from which the advertising packet has been transmitted (P10). Subsequently, the pairing process for battery pack 10 and portable terminal device 30 is performed. For example, the pairing process is performed through the procedures described below.

When first wireless communication unit 16 receives the pairing request, first controller 15 of battery pack 10 accepts the pairing request unless the pairing request has been transmitted from an unsupported device. Using first wireless communication unit 16, first controller 15 returns a pairing response indicating acceptance of the pairing request to a pairing request source.

When third wireless communication unit 36 receives the pairing response indicating the acceptance of the pairing request, third controller 35 of portable terminal device 30 transmits a pairing confirmation including the obtained verification code to a pairing request destination. When first wireless communication unit 16 receives the pairing confirmation including the verification code, first controller 15 of battery pack 10 checks the verification code included in the received pairing confirmation against the verification code transmitted to vehicle 20 earlier. When these match, first controller 15 returns a pairing confirmation indicating a verification success to the pairing request source.

When third wireless communication unit 36 receives the pairing confirmation indicating the verification success, third controller 35 of portable terminal device 30 generates a short term key (STK) using the verification code obtained. Third controller 35 transmits security information including the generated short term key to the pairing request destination. When first wireless communication unit 16 receives the security information including the short term key, first controller 15 of battery pack 10 returns a security information receipt confirmation to the pairing request source.

First controller 15 of battery pack 10 generates a long term key (LTK) for encrypting data to be exchanged via BLE, and performs a bonding process. First controller 15 encrypts the generated long term key using the short term key received from the pairing request source. First controller 15 transmits, to the pairing request source, security information including the long term key, as an encryption key, encrypted using the short term key.

When third wireless communication unit 36 receives the security information including the long term key, third controller 35 of portable terminal device 30 decrypts the received, encrypted long term key using the short term key being held by third controller 35 itself, and performs a bonding process using the long term key decrypted.

Through these procedures, the long term key to be used for BLE communication is exchanged between battery pack 10 and portable terminal device 30, and battery pack 10 and portable terminal device 30 are paired (P11, P12). Note that when first wireless communication unit 16 and third wireless communication unit 36 include microcontrollers, the generation and exchange of the short term key, the generation and exchange of the long term key, and the bonding process using the long term key may be performed in first wireless communication unit 16 and third wireless communication unit 36.

Figure 5:
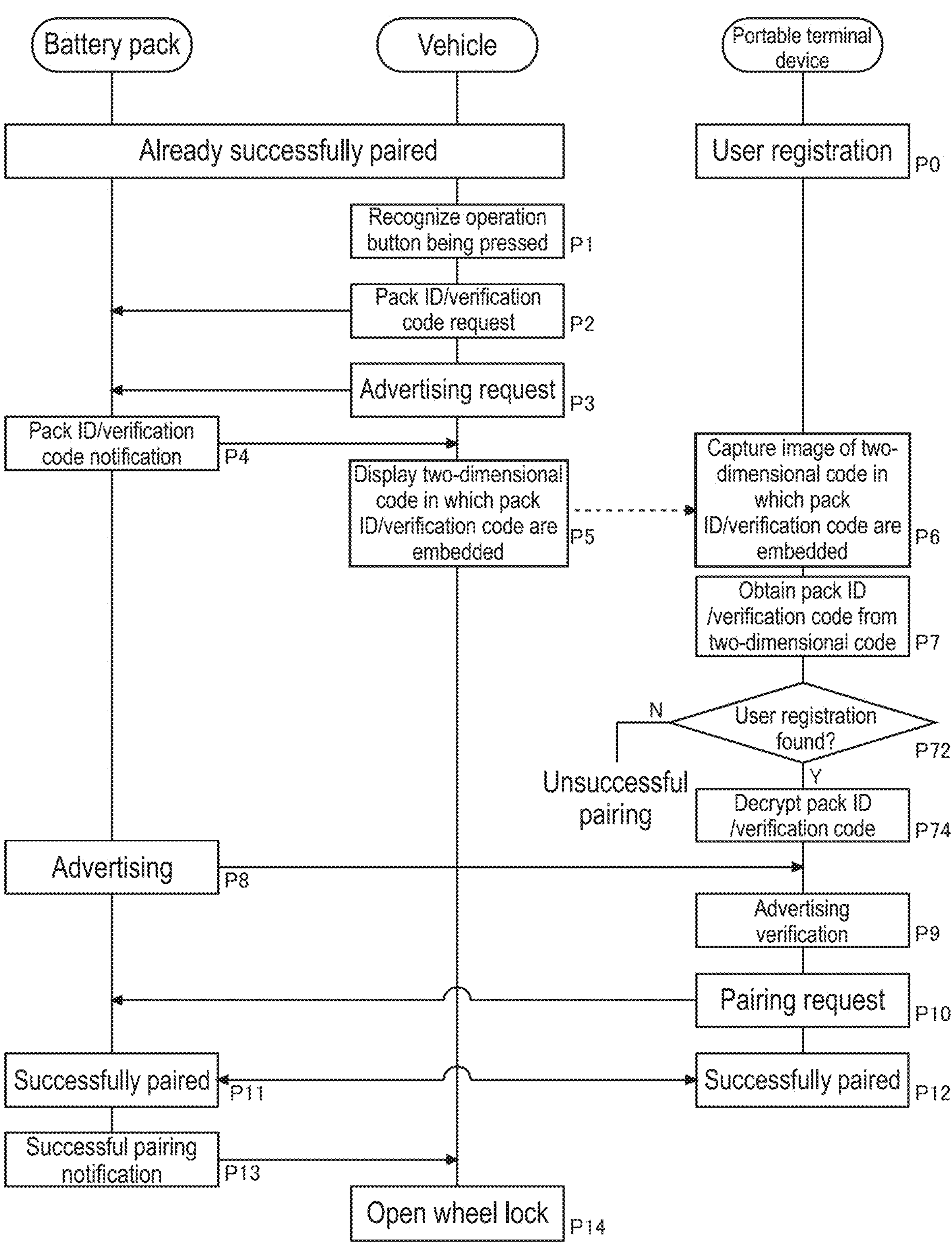
FIG. 5 is a sequence diagram illustrating a second working example of a pairing process for a battery pack and a portable terminal device.

FIG. 5 is a sequence diagram illustrating a second working example of the pairing process for battery pack 10 and portable terminal device 30. In the second working example, only a user who has completed user registration with battery pack management system 3 in advance can obtain the pack ID and the verification code using portable terminal device 30. In the second working example, the main target is a user who uses an electric assisted bicycle rental service or an electric assisted bicycle sharing service. Hereinafter, the differences from the sequence diagram in the first working example illustrated in FIG. 4 will be described.

A user who uses an electric assisted bicycle rental service or an electric assisted bicycle sharing service registers user information with battery pack management system 3 from portable terminal device 30 via network 2 before using an electric assisted bicycle (P0). The user information also includes a method for paying a usage fee for the electric assisted bicycle (such as a bank account number and a credit card number).

A user may complete user registration with battery pack management system 3 via a pack management app downloaded earlier to portable terminal device 30 or may use portable terminal device 30 to directly access a website managed by battery pack management system 3 and complete user registration. The user who completed the user registration is given a decryption key for decrypting the pack ID and the verification code that have been encrypted.

A distribution server that manages the pack management app may be configured to permit portable terminal device 30 that has accessed the distribution server to download the pack management app on condition that the user registration with battery pack management system 3 has been completed. In this case, the aforementioned decryption key may be incorporated in the pack management app.

In process P4 in FIG. 5, at the time of transmitting the pack ID of battery 10 itself and the verification code to vehicle 20, first controller 15 of battery pack 10 encrypts the pack ID of battery pack 10 itself and the verification code with the long term key provided in advance from battery pack management system 3. First controller 15 transmits the pack ID as an encryption key and the encrypted verification code to vehicle 20.

In process P5, second controller 25 of vehicle 20 obtains the encrypted pack ID and the encrypted verification code from battery pack 10, generates a two-dimensional code in which the encrypted pack ID and the encrypted verification code that have been obtained are embedded, and causes display unit 28 to display the two-dimensional code.

The user starts the pack management app on portable terminal device 30 and uses imager 31 to capture an image of the two-dimensional code displayed on display unit 28 of vehicle 20 (P6). Third controller 35 reads the two-dimensional code in the image that is input from imager 31, and obtains the encrypted pack ID and the encrypted verification code embedded in the two-dimensional code that has been read (P7).

When the user has completed the user registration in advance (Y in P72), third controller 35 decrypts the encrypted pack ID and the encrypted verification code with the decryption key obtained in advance (P74). When the user registration has not been completed in advance (N in P72), there is no decryption key, and thus the encrypted pack ID and the encrypted verification code cannot be decrypted. Therefore, the pairing process for battery pack 10 cannot be performed.

Note that third controller 35 may be designed to transmit, to battery pack management system 3 via network 2, the encrypted pack ID and the encrypted verification code that have been obtained from the two-dimensional code. When portable terminal device 30 of a user who has completed the user registration in advance accesses battery pack management system 3, battery pack management system 3 decrypts the encrypted pack ID and the encrypted verification code and returns the decrypted pack ID and the decrypted verification code to portable terminal device 30 that has accessed battery pack management system 3.

When battery pack 10 and portable terminal device 30 are successfully paired (P11, P12), first controller 15 of battery pack 10 transmits, via wired or wireless communication, a notification of successful pairing with portable terminal device 30 to vehicle 20 to which battery pack 10 is attached (P13). When second controller 25 of vehicle 20 receives the notification of successful pairing with portable terminal device 30 from battery pack 10, second controller 25 of vehicle 20 opens a wheel lock (P14).

The wheel lock is an electromagnetic lock that is attached to a front wheel or a rear wheel to restrict the rotation of the front wheel or the rear wheel in a locked state and lift the restriction on the rotation of the front wheel or the rear wheel in an unlocked state. In the second working example, an operation entity that provides an electric assisted bicycle rental service or an electric assisted bicycle sharing service permits only a user who has completed the user registration to use an electric assisted bicycle.

As described above, in the present exemplary embodiment, the security of the pairing process for battery pack 10 and portable terminal device 30 can be improved at low cost without impairment of the convenience for users. There is no need to additionally provide a display on battery pack 10, meaning that an increase in the cost of battery pack 10 can be reduced. Providing a display on vehicle 20 will lead to an increase in cost as compared to a vehicle of a type on which no display is provided, but the cost of the display is negligible relative to the total cost of vehicle 20, meaning that the impact of the increase in the cost is minor. Portable terminal device 30 only needs to install the pack management app; no hardware will be added.

When the verification code in the form of a barcode sticker, a QR code sticker, or another sticker is attached to battery pack 10, it is difficult to pair portable terminal device 30 and battery pack 10 attached to vehicle 20 structured so that battery pack 10 is not exposed to the outside. Furthermore, the value of the verification code cannot be changed unless the barcode sticker, the QR code sticker, or another sticker is replaced with a new one. Moreover, the information of the verification code is basically exposed to the outside.

Regarding this issue, in the present exemplary embodiment, even when battery pack 10 is attached to vehicle 20 structured so that battery back 10 is not exposed to the outside, battery pack 10 and portable terminal device 30 can be paired. Furthermore, a new verification code can be generated every time battery pack 10 issues a verification code. Moreover, the verification code is displayed on display unit 28 of vehicle 20 only at the time of notification of the verification code. Therefore, it is possible to significantly increase the level of security as compared to the case where a barcode sticker, a QR code sticker, or another sticker is attached to battery pack 10.

A user only needs to use imager 31 of portable terminal device 30 to capture an image of the two-dimensional code displayed on display unit 28 of vehicle 20 so that portable terminal device 30 can retrieve the verification code, and thus the operation becomes less cumbersome. Furthermore, human errors in data entry can be eliminated, and the likelihood of successful pairing can improve. Moreover, the verification code can be obtained in a short time. In addition, even when the number of digits of the verification increases, the operational burden on users does not increase.

The present disclosure has been described thus far based on the exemplary embodiment. The exemplary embodiment is merely an example; a person having ordinary skill in the art will readily appreciate that various variations are possible as a combination of these structural elements and these processes and that these variations are also included in the scope of the present disclosure.

In the first working example, on condition that the wheel lock designed to be openable with a physical key has been open, second controller 25 of vehicle 20 may cause display unit 28 to display the two-dimensional code in which the pack ID and the verification code are embedded. In this case, only a person who owns the physical key to vehicle 20 (in principle, an owner) can enable pairing between battery pack 10 and portable terminal device 30. A third party who is not properly authorized cannot enable pairing between battery pack 10 and portable terminal device 30 as long as the physical key to vehicle 20 is lost, meaning that the security is further improved.

In the above-described exemplary embodiment, second controller 25 of vehicle 20 generates a two-dimensional code in which the pack ID and the verification code obtained from battery pack 10 are embedded, and causes display unit 28 to display the two-dimensional code. In this regard, second controller 25 of vehicle 20 may cause display unit 28 to directly display numbers, character strings, or the like of the pack ID and the verification code obtained from battery pack 10. In this case, the numbers, the character strings, or the like displayed may be captured by imager 31 of portable terminal device 30 and retrieved into portable terminal device 30 or may be entered on operation display unit 33 by a user and retrieved into portable terminal device 30.

In the above-described exemplary embodiment, the pack ID is included in the two-dimensional code to be displayed on display unit 28 of vehicle 20, the pack ID is included in the advertising packet, and portable terminal device 30 checks the pack ID included in the advertising packet against the pack ID obtained from the two-dimensional code. In this regard, the checking of the pack ID by portable terminal device 30 may be omitted. In this case, battery pack 10 does not need to transmit the pack ID to vehicle 20 or include the pack ID into the advertising packet. This is effective particularly when display unit 28 of vehicle 20 has a small display area, because the amount of information to be displayed can be reduced.

In the above-described exemplary embodiment, the verification code is presented to a user of portable terminal device 30 using the two-dimensional code displayed on display unit 28 of vehicle 20. In this regard, the verification code notification is not limited to a method in which visible information is used. Sound information can be used to notify a user of portable terminal device 30 of the verification code.

For example, a loudspeaker may be mounted on vehicle 20 so that when a predetermined operation is performed on operation unit 29, second controller 25 causes said loudspeaker to output speech indicating the pack ID and the verification code. A user enters, on operation display unit 33 of portable terminal device 30, the pack ID and the verification code that have been heard. Furthermore, when a predetermined operation is performed on operation unit 29, second controller 25 causes said loudspeaker to output speech or audio in which the pack ID and the verification code are embedded as a digital watermark. A user uses a microphone (not illustrated in the drawings) of portable terminal device 30 to record said speech or audio. The digital watermark of the pack ID and the verification code embedded is detected using an audio analysis function of the pack management app. In this manner, portable terminal device 30 can also obtain the pack ID and the verification code from vehicle 20 as sound information.

The above exemplary embodiment has described an example in which battery pack 10 incorporating storage battery 11 is used. In this regard, a capacitor pack incorporating a capacitor that includes an electric double layer capacitor cell, a lithium ion capacitor cell, or the like may be used. The battery pack and the capacitor pack are collectively referred herein to as a power storage pack.

The above exemplary embodiment assumes that vehicle 20 to which the power storage pack is attached is an electric assisted bicycle. In this regard, vehicle 20 is not limited to the electric assisted bicycle; examples of vehicle 20 include an electric motorcycle (an electric scooter), an electric kick scooter, an electric vehicle (including a low-speed electric vehicle such as a golf cart or a land car), and a railroad car. Furthermore, an object to which the power storage pack is attached is not limited to vehicle 20; examples of said object include an electric mobile vehicle such as an electric boat or ship or a multirotor (a drone).

Note that the exemplary embodiment may be specified according to the following items.

[Item 1] An electric mobile vehicle (20) to which a power storage pack (10) is attached, the electric mobile vehicle (20) including:

a control unit (25) that obtains a verification code from the power storage pack (10) via wired or wireless communication, the verification code being used in a process of exchanging an encryption key that is to be used for short-range wireless communication between the power storage pack (10) and a portable terminal device (30); and a notification unit (28) that presents, to a user of the portable terminal device (30), a tentative notification of the verification code obtained from the power storage pack (10).

With this, by using the verification code for notification that is only tentative, it is possible to improve the security of the pairing process for the power storage pack (10) and the portable terminal device (30).

[Item 2] The electric mobile vehicle (20) according to item 1, wherein the notification unit (28) includes a display unit (28) configured to display the verification code.

With this, the power storage pack (10) does not need to include a display unit. Furthermore, since the display unit (28) of the electric mobile vehicle (20) is provided in a position clearly visible to users, the verification code is highly visible.

[Item 3] The electric mobile vehicle (20) according to item 1 or 2, further including: an operation unit (29) that receives an operation performed by the user, wherein when the control unit (25) recognizes a predetermined operation performed on the operation unit (29), the control unit (25) transmits, to the power storage pack (10), an obtainment request for the verification code and a request for transmission of a signal for notifying a nearby device of presence of the power storage pack (10) via the short-range wireless communication.

This allows the portable terminal device (30) to verify whether the power storage pack (10) attached to the electric mobile vehicle (20) and the power storage pack (10) communicating with the portable terminal device (30) are the same.

[Item 4] The electric mobile vehicle (20) according to any one of items 1 to 3, wherein when the control unit (25) obtains, from the power storage pack (10), a notification indicating that the process of exchanging the encryption key that is to be used for the short-range wireless communication between the power storage pack (10) and the portable terminal device (30) has been completed, the control unit (25) permits the electric mobile vehicle (20) to travel.

Thus, the completed pairing between the power storage pack (10) and the portable terminal device (30) can be a condition for the electric mobile vehicle (20) to start traveling.

[Item 5] A portable terminal device (30) including:

a wireless communication unit (36) configured to perform short-range wireless communication;

an obtainment unit (31) that obtains a verification code from the electric mobile vehicle (20) according to one of claims 1 to 4, as triggered by an operation performed by a user; and a control unit (35) that performs a process of exchanging an encryption key with a power storage pack (10) using the verification code, the encryption key being used for the short-range wireless communication with the power storage pack (10), the power storage pack (10) being attached to the electric mobile vehicle (20).

With this, it is possible to improve the security of the pairing process for the power storage pack (10) and the portable terminal device (30).

[Item 6] The portable terminal device (30) according to item 5, wherein the obtainment unit (31) includes an imager (31), as triggered by an operation performed by the user, the imager (31) captures an image of the verification code displayed on the display unit (28) of the electric mobile vehicle (20) according to item 2, and the control unit (35) performs image recognition of the image captured by the imager (31), detects the verification code, and performs the process of exchanging the encryption key using the verification code detected.

With this, the user operation of entering the verification code can be made less cumbersome.

[Item 7] The portable terminal device (30) according to item 6, wherein the verification code includes identification information of the power storage pack (10), and when a match is found between identification information included in a signal received by the wireless communication unit (36) and the identification information included in the verification code detected in the image recognition, the control unit (35) of the portable terminal device (30) verifies that the power storage pack (10) attached to the electric mobile vehicle (20) and an entity performing the short-range wireless communication with the portable terminal device (30) are identical.

Thus, it is possible to verify whether the power storage pack (10) attached to the electric mobile vehicle (20) and the power storage pack (10) communicating with the portable terminal device (30) are identical.

[Item 8] The portable terminal device (30) according to item 6 or 7, wherein the control unit (15) of the portable terminal device (30) owned by a user who has not completed user registration with a management system (3) that manages a state of each of a plurality of power storage packs (10) is prohibited from performing the process of exchanging, with the power storage pack (10), the encryption key that is to be used for the short-range wireless communication.

This allows for an operation in which only a user who has completed the user registration can use the electric mobile vehicle (20).

[Item 9] A wireless communication program that causes a computer to execute the processes of:

obtaining a verification code from the electric mobile vehicle (20) according to one of items 1 to 4, as triggered by an operation performed by a user; and performing a process of exchanging an encryption key with a power storage pack (10) using the verification code, the encryption key being used for short-range wireless communication with the power storage pack (10), the power storage pack (10) being attached to the electric mobile vehicle (20).

With this, it is possible to improve the security of the pairing process for the power storage pack (10) and the portable terminal device (30).

REFERENCE SIGNS LIST

2 network
3 battery pack management system
10 battery pack
20 vehicle
30 portable terminal device
11 storage battery
15 first controller
16 first wireless communication unit
17 first antenna
21 motor
22 inverter
25 second controller
26 second wireless communication unit
27 second antenna
28 display unit
29 operation unit
31 imager
32 GPS receiver
33 operation display unit
35 third controller
36 third wireless communication unit
37 third antenna

The invention claimed is:

1. An electric mobile vehicle to which a power storage pack is attached, the electric mobile vehicle comprising:

a controller that obtains a verification code from the power storage pack via wired or wireless communication, the verification code being to be used in a process of exchanging an encryption key that is to be used for short-range wireless communication between the power storage pack and a portable terminal device;

a notification unit that notifies a user of the portable terminal device of the verification code obtained from the power storage pack; and an operation unit that receives an operation performed by the user, wherein when the controller recognizes a predetermined operation performed on the operation unit, the controller transmits, to the power storage pack, an obtainment request for the verification code and a request for transmission of a signal for notifying a nearby device of presence of the power storage pack via the short-range wireless communication.

2. The electric mobile vehicle according to claim 1, wherein the notification unit includes a display unit configured to display the verification code.

3. The electric mobile vehicle according to claim 1, wherein when the controller obtains, from the power storage pack, a notification indicating that the process of exchanging the encryption key that is to be used for the short-range wireless communication between the power storage pack and the portable terminal device has been completed, the controller permits the electric mobile vehicle to travel.

4. A portable terminal device comprising:

a wireless communication unit configured to perform short-range wireless communication;

an obtainment unit that obtains a verification code notified from the electric mobile vehicle according to claim 1, as triggered by an operation performed by a user; and a controller that performs a process of exchanging an encryption key with a power storage pack using the verification code, the encryption key being used for the short-range wireless communication with the power storage pack, the power storage pack being attached to the electric mobile vehicle.

5. A non-transitory machine-readable recording medium that stores a wireless communication program that causes a computer to execute the processes of:

obtaining a verification code notified from the electric mobile vehicle according to claim 1, as triggered by an operation performed by a user; and performing a process of exchanging an encryption key with a power storage pack using the verification code, the encryption key being used for short-range wireless communication with the power storage pack, the power storage pack being attached to the electric mobile vehicle.

6. A portable terminal device comprising:

a wireless communication unit configured to perform short-range wireless communication;

an obtainment unit that obtains a verification code notified from an electric mobile vehicle, as triggered by an operation performed by a user, wherein the electric mobile vehicle, to which a power storage pack is attached, comprises:

(1) a vehicle-side controller that obtains the verification code from the power storage pack via wired or wireless communication, the verification code being to be used in a process of exchanging an encryption key that is to be used for short-range wireless communication between the power storage pack and the portable terminal device, and (2) a notification unit that notifies the user of the portable terminal device of the verification code obtained from the power storage pack and includes a display unit configured to display the verification code; and a controller that performs a process of exchanging an encryption key with the power storage pack using the verification code, the encryption key being used for the short-range wireless communication with the power storage pack, the power storage pack being attached to the electric mobile vehicle, wherein the obtainment unit includes an imager, as triggered by an operation performed by the user, the imager captures an image of the verification code displayed on the display unit, and the controller of the portable terminal device performs image recognition of the image captured by the imager, detects the verification code, and performs the process of exchanging the encryption key using the verification code detected.

7. The portable terminal device according to claim 6, wherein the verification code includes identification information of the power storage pack, and when a match is found between identification information included in a signal received by the wireless communication unit and the identification information included in the verification code detected in the image recognition, the controller of the portable terminal device verifies that the power storage pack attached to the electric mobile vehicle and an entity performing the short-range wireless communication with the portable terminal device are identical.

8. The portable terminal device according to claim 6, wherein the controller of the portable terminal device owned by a user who has not completed user registration with a management system that manages a state of each of a plurality of power storage packs is prohibited from performing the process of exchanging, with the power storage pack, the encryption key that is to be used for the short-range wireless communication.

* * * * *